Patented Apr. 12, 1932

1,853,435

UNITED STATES PATENT OFFICE

ERWIN KRAMER, OF COLOGNE-DEUTZ, AND BERNARD BOLLWEG AND LUDWIG ZEH, OF LEVERKUSEN-ON-THE-RHINE, GERMANY, ASSIGNORS TO GENERAL ANILINE WORKS, INC., OF NEW YORK, N. Y., A CORPORATION OF DELAWARE

SUBSTITUTED SULPHUR DYESTUFF

No Drawing. Application filed June 9, 1930, Serial No. 460,093, and in Germany June 13, 1929.

The present invention relates to a process of preparing substituted sulphur dyestuffs on the fiber and to the fibers dyed with said substituted sulphur dyestuffs.

In the process hereinafter described we use as starting materials the sulphur dyestuffs which are obtainable by reacting upon a halogenated dinaphthylenedioxide with a sulphurating agent at elevated temperatures which process is more fully described in the British specification 325,519.

We have found that new valuable substituted sulphur dyestuffs can be prepared on vegetable fibers by dyeing in the usual manner the fibers with one of the above mentioned sulphur dyestuffs, rinsing the goods and treating them with a solution of an alkylating, aralkylating or arylating agent, for instance, with a solution of dimethyl-benzylphenyl-ammonium chloride at an elevated temperature, favorably in a boiling bath and preferably in the presence of an agent capable of exerting a reducing action and of a small amount of alkali, said process being described in U. S. Letters Patent 688,999.

By working at a lower temperature or without the addition of a reducing agent, the development is retarded and it may, according to the agents used, in the subsequent treatment entirely fail to take place. The dyeings obtained display very satisfactory fastness to boiling and kier boiling. The shades obtainable according to our new process are yellow, orange and red.

The invention is illustrated by the following examples, without being limited thereto:

*Exampe 1.*—The dyeing obtained on cotton by means of the sulphur dyestuff produced by heating tetrachlorodinaphthylenedioxide with sodium sulphide according to the direction of British specification 325,519, Example 3, is squeezed and rinsed and then drawn for 10–20 minutes through a boiling bath, which is charged with 2–4 cm. of caustic soda lye (40° Bé.), 1,5 grams of hydrosulphite and 10 grams of dimethylbenzylphenylammonium chloride to the liter. A very clear, reddish orange dyeing is obtained. Trimethylnaphthylammonium chloride yields a more yellowish shade, while the chlorohydrins yield brick red shades.

*Example 2.*—By using the sulphur dyestuff which is obtained from pentachlorodinaphthylenedioxide by heating with sulphur and sodium sulphide as is described in British specification 325,519, Example 4, and employing dimethylbenzylphenylammonium chloride a clear, strongly yellowish red is obtained, while the chlorohydrins yield red shades.

Furthermore by subsequent treatment with the dyestuff prepared from tetrabromodinaphthylenedioxide according to Example 5 of the British specification 325,519, yellow shades are produced, while the dyestuff prepared from hexachlorodinaphthylenedioxide according to Example 6 of British specification 325,519 leads to strongly bluish-red shades.

We claim:

1. The process which comprises dyeing vegetable fibers with a sulphur dyestuff prepared by sulphurating a halogenated dinaphthylenedioxide, rinsing same and boiling them in an aqueous bath containing a small amount of alkali, a reducing agent and a compound of the group consisting of alkylating aralkylating and arylating agents.

2. The process which comprises dyeing vegetable fibers with a sulphur dyestuff prepared by sulphurating a compound of the group consisting of tetrachlorodinaphthylenedioxide and pentachlorodinaphthylenedioxide, rinsing same and boiling them in an equeous bath containing a small amount of alkali, a reducing agent and a compound of the group consisting of alkylating, aralkylating and arylating agents.

3. The process which comprises dyeing vegetable fibers with a sulphur dyestuff prepared by sulphurating a compound of the group consisting of tetrachlorodinaphthylenedioxide and pentachlorodinaphthylenedioxide, rinsing same and drawing them through a boiling bath which is chared with 2-4 cm. of caustic soda lye (40° Bé), 1.5 grams of hydrosulfite and 10 grams of dimethylbenzylphenylammonium chloride to the liter.

4. Vegetable fibers dyed with a dyestuff of the group consisting of alkylated, aralkylated and arylated sulphur dyestuffs prepared by sulphurating a halogenated dinaphthylenedioxide.

5. Vegetable fibers dyed with a dyestuff of the group consisting of alkylated, aralkylated and arylated sulphur dyestuffs prepared by sulphurating a compound of the group consisting of tetrachlorodinaphthylenedioxide and pentachlorodinaphthylenedioxide.

6. Vegetable fibers dyed with a benzylated sulphur dyestuff prepared by sulphurating a compound of the group consisting of tetrachlorodinaphthylenedioxide and pentachlorodinaphthylenedioxide.

In testimony whereof, we affix our signatures.

ERWIN KRAMER.
BERNHARD BOLLWEG.
LUDWIG ZEH.